Patented Mar. 18, 1952

2,589,450

UNITED STATES PATENT OFFICE 2,589,450

REMOVING COLOR BODIES IMPARTED TO HYDROCARBONS IN SWEETENING THE SAME

John P. Stanton, Des Plaines, Ill., assignor to The Pure Oil Company, Chicago, Ill., a corporation of Ohio No Drawing. Application May 22, 1948, Serial No. 28,745

15 Claims. (Cl. 196—29)

This invention relates to a method for decolorizing hydrocarbon products, particularly lower boiling distillates which have been sweetened or are being sweetened for use as motor fuels.

More specifically, the invention is concerned with the process for the removal of various color bodies from a hydrocarbon product which has been sweetened by catalytic aeration and alkali washing.

Sweetening operations which entail the aeration of a hydrocarbon in the presence of an alkali solution containing a high proportion of caustic alkali together with a small amount of a catalyst, such as a wood tar distillate, tannic acid, gallic acid, digallic acid, various phenolic type compounds and coal tar fractions, are characterized by the fact that the hydrocarbon is very effectively sweetened, but concomitant with the sweetening becomes colored, particularly in the first few washing operations performed with a treating solution. Whether the coloration developed by the hydrocarbon product is due to the extraction of oxidized catalyst from the solution, or some more subtle cause is of no moment in the pragmatic matter of preparing a satisfactory commercial product. The requirements are that the hydrocarbon should be sweet and substantially water-white. Accordingly, when color bodies are left behind after a sweetening operation, corrective measures must be taken.

It is, therefore, a fundamental object of the invention to provide a method of removing color bodies from hydrocarbons which have been sweetened.

It is a second object of the invention to provide a process which can be simply incorporated with current alkali washing and sweetening operations to accomplish such decolorizing of hydrocarbon products as may be necessary.

Other objects and advantages of my invention will in part be obvious and in part appear hereinafter.

The invention comprises the process of removing color bodies from hydrocarbons, particularly sweetened hydrocarbons, in which the liquid is intimately contacted with an alkanol amine having alkanol groups of about 2 to 6 carbon atoms in the molecule to remove the color bodies contained therein and the invention involves the steps and the combination of steps in the relationship each to the other as shall be hereinafter described in greater detail. The most satisfactory of the alkanol amines are the mono-, di-, and triethanolamines, for they are compounds which contain a strong enough polar group to make them substantially insoluble in hydrocarbons, in the presence of an aqueous medium, yet they contain sufficient of the hydrocarbon group to act as excellent solvents for the color bodies, so that upon contact of the alkanol amine with the hydrocarbon, an extraction of the color bodies will take place. Other alkanol amines can be used, but the higher ones in the scale become so hydrocarbonaceous in nature that their solubility in the hydrocarbon can become objectionably high. However, the solubility of the higher alkanol amines in the hydrocarbons can be reduced by employing them in the presence of large amounts of water. From a practical point of view, the use of tertiary alkanol amines is favored over the use of primary or secondary amines, inasmuch as the tertiary amines have no reactive hydrogens in the amine group and therefore are more stable chemically.

The general operation of the process involves contacting the hydrocarbon to be decolorized with about an equal volume of the alkanol amine, either in water solution or in the alkali treating solution, which can be accomplished by agitating or otherwise intimately contacting the alkanol amine with the hydrocarbon, allowing the hydrocarbon and the treating solution to stratify after a sufficient period of contact and removing the alkanol amine or treating solution. A countercurrent tower can be used for contacting operations and, in that case, the tower would be of sufficient length to permit balancing of the flow rates therethrough with the time of contact to obtain a desired or necessary extraction. I have found that aqueous ethanolamine solutions containing 25 to 75 per cent of the ethanolamine are effective decolorizers when used as afterwashes. Alkali solutions of the types mentioned containing the ethanolamine in like amount are effective to sweeten and decolorize simultaneously.

In preparation for the process, a solution of the appropriate concentration of sodium hydroxide is made up, catalyst added and the alkanol amine added in the amount desired. When a variation in the composition of the solution is desired, it is made in the original preparation or by subsequent addition of that component to the solution.

The following examples will illustrate the method of carrying out the invention:

*Example 1.*—Five volumes of a gasoline having an initial boiling point of 131° F., an end point of 378° F., 0.01 per cent of mercaptan sulfur, and an A. P. I. gravity of 61.3° was sweetened by agitation for five minutes in the presence of air with one volume of a treating solution containing 18.0 per cent sodium hydroxide, 12.0 per cent naphthenic acid, 12.0 per cent cresols, 3.0 per cent of wood tar, and 55.0 per cent water. The product, though sweet, had a dark reddish yellow color.

When the gasoline was washed with a 50 per cent aqueous solution of triethanolamine, the color was effectively removed.

When an alkali solution containing 8.5 per cent of sodium hydroxide, 6.0 per cent naphthenic acid, 6.0 per cent cresols, 1.5 per cent of wood tar, 28.0 per cent of water and 50.0 per cent of triethanolamine was used to sweeten a sample of the same gasoline in the presence of air, the product came through sweet and substantially water-white. Repeated use of the treating solution continued to produce sweet and substantially water-white products.

*Example 2.*—A treating solution was made up to contain 3 per cent of wood tar, 17.8 per cent of sodium hydroxide, 12.1 per cent naphthenic acids, 12.1 per cent cresols and 55.0 per cent of water for use as a basis in making comparisons with ethanolamine fortified solutions. One volume of gasoline containing 0.01 per cent of mercaptan sulfur was agitated in the presence of air for a period of five minutes with about 10 per cent of its volume of the solution. The hydrocarbon product developed a dark, reddish brown color and showed 0.0007 per cent of mercaptan sulfur.

*Example 3.*—A solution was made up containing 1.5 per cent of hard wood tar, 50 per cent of triethanolamine, 8.9 per cent of sodium hydroxide, 6.1 per cent of naphthenic acids, 6.1 per cent of cresols and 27.4 per cent of water. It will be observed from these figures that the solution was the same as that used in Example 2 with the same ingredients in the same relative proportions, but that 50 per cent of the volume of the solution was replaced with triethanolamine. After treatment of one volume of sour gasoline, containing 0.01 per cent of mercaptan sulfur, with this solution, using it in the amount of 10 per cent of the gasoline by volume for a period of five minutes contact, the gasoline showed only a slight coloration and a reduced content of mercaptan sulfur. After treatment of a third sample of the same gasoline with the solution, the product was substantially water-white and had a mercaptan sulfur content of 0.0026 per cent. Comparison of this example with Example 2 illustrates that solutions containing the ethanolamine are effective to desulfurize and decolorize the hydrocarbon simultaneously, although when freshly prepared, the first and sometimes the second batch of gasoline treated will show some color. Thus, the appropriate use of the ethanolamine-containing treating solution for sweetening operations involves striking a balance between adequate sulfur removal and color body removal. In general, the behavior of the treating solution used in sweetening of successive samples of a gasoline is as follows:

TABLE

| Treatment No. | Treating Solution | Gasoline | Color of Product |
|---|---|---|---|
| 1 | Alkali-alkanolamine-wood tar. | First Batch sour. | Sweet but discolored. |
| 2 | ___do___ | Second Batch Fresh Gasoline sour. | Sweet, Slight discoloration. |
| 3 | ___do___ | Third Batch Fresh Gasoline sour. | Sweet, Water-white. |
| 4 | ___do___ | Fourth Batch Fresh Gasoline sour. | Do. |
| . | . | . | . |
| 22 | ___do___ | 22nd Batch Fresh Gasoline sour. | Do. |

In one series of tests, the treating solution, after twenty-two operations was still fully effective in producing sweet and water-white gasoline.

*Example 4.*—A solution containing 2 per cent of wood tar, 45.5 per cent triethanolamine, 16.0 per cent of sodium hydroxide, 5.2 per cent naphthenic acids, 5.2 per cent of cresols and 24.9 per cent of water was made up and used to treat five times its volume of sour gasoline containing 0.01 per cent of mercaptan sulfur. The first sample of gasoline treated was substantially sweet and had some coloration. The third sample of gasoline treated was sweet and water-white.

*Example 5.*—A further test was made on sour gasoline containing 0.01 per cent of mercaptan sulfur using a solution containing 4.2 per cent of wood tar, 32.9 per cent of triethanolamine, 13.7 per cent of sodium hydroxide, 4.8 per cent of naphthenic acids, 13.0 per cent of cresols and 31.4 per cent of water. After a first treatment of the gasoline for five minutes with 20.0 per cent of its volume of said solution by agitating the two in the presence of air, the color of the product was dark. After a third portion of gasoline had been treated with the ethanolamine fortified solution, it was found to be very light in color. Fresh batches of gasoline extract loosely held color bodies from the treating solution and appear in the hydrocarbon after a washing. Thus, the first one or two contacts of a given batch of solution with a hydrocarbon serve to remove loosely held color bodies, so that a subsequent batch of fresh gasoline will not become appreciably discolored.

*Example 6.*—Eighty milliliters of a test solution composed of 18 per cent of sodium hydroxide, 12.3 per cent cresol, 12.3 per cent naphthenic acids, 55.4 per cent of water, 2 per cent of wood tar, was agitated in the presence of air for five minutes with 800 milliliters of sour gasoline containing 0.01 per cent of mercaptan sulfur. The two liquids were separated and the slightly discolored, sweetened gasoline was agitated for one minute with an equal volume of 25 per cent aqueous monoethanolamine. After the mixture had settled, the gasoline was decanted and its color was observed to be water-white.

When monoethanolamine or diethanolamine is used as an afterwash or to fortify the alkaline solution for contacting the hydrocarbon, results parallel those obtained with triethanolamine. Thus, the process includes operations in which hydrocarbons are contacted with catalytic alkali solutions containing about 25 to 75 per cent of mono-, di-, or triethanolamine. The alkali solutions used in the sweetening operations are about 5 to 40 weight per cent aqueous solutions of sodium hydroxide (potassium or other alkali hydroxides are also effective), containing about 0.5 to 3 per cent of an oxidation catalyst, such as those disclosed in Bond Patent 2,369,771, including hard wood tar, pyrogallol, tannin, gallic acid, digallic acid and other quinone-forming phenolic compounds and substances containing the same which are useful in oxidation sweetening operations, but induce some color in the sweetened hydrocarbon.

The other alkanol amines are useful in the process and can be used in substantially the same manner as described for the ethanolamines. It is preferred that the alkanol amines be used in aqueous solution and when the higher ones are used, it will be found the more dilute solutions permit operation with minimum loss of the alkanolamine.

From these examples and description of the process, it is evident that the process for sweetening which employs the ethanolamines in the sweetening operation or in an afterwash will effectively yield a sweet colorless gasoline. The data, examples and description given above should, therefore, be interpreted as illustrative of the process and not restrictive.

What is claimed is:

1. In a catalytic oxidation sweetening process for producing a water-white, doctor sweet petroleum product, the steps which comprise contacting a mercaptan-containing petroleum product in the presence of a free oxygen-containing gas with a treating solution containing an alkali metal hydroxide and a phenolic type oxidation catalyst, said oxidation catalyst being capable of promoting the chemical conversion of mercaptans to disulfides and imparting a discoloration to the doctor sweet petroleum product, and removing said discoloration by contacting said treated hydrocarbons with an aliphatic alkanolamine containing alkanol groups having 2 to 6 carbon atoms.

2. A method in accordance with claim 1 in which the alkanolamine is monoethanolamine.

3. A method in accordance with claim 2 in which said oxidation catalyst is wood tar.

4. A method in accordance with claim 1 in which the alkanolamine is diethanolamine.

5. A method in accordance with claim 4 in which said oxidation catalyst is wood tar.

6. A method in accordance with claim 1 in which the alkanolamine is triethanolamine.

7. A method in accordance with claim 6 in which said oxidation catalyst is wood tar.

8. A method for producing a water-white, doctor sweet petroleum product in a catalytic oxidation sweetening process which comprises treating a mercaptan-containing petroleum product in the presence of a free oxygen-containing gas with a treating solution containing an alkali metal hydroxide and a phenolic type oxidation catalyst, said oxidation catalyst being capable of promoting the chemical conversion of mercaptans to disulfides and imparting a discoloration to the sweetened hydrocarbon, and concomitant with said treating, contacting said sweetened hydrocarbon with said aliphatic alkanolamine containing alkanol groups having 2 to 6 carbon atoms to remove the color bodies produced by treating the petroleum product with said oxidation catalyst.

9. A method in accordance with claim 8 in which said treating solution contains about 25 to 75% of an aliphatic alkanolamine.

10. A method for treating a light petroleum hydrocarbon fraction containing mercaptans to produce a water-white, doctor sweet product which comprises contacting the said fraction in the presence of a free oxygen-containing gas with a treating solution comprising an alkali metal hydroxide and a phenolic type oxidation catalyst, said oxidation catalyst being capable of promoting the chemical conversion of mercaptans to disulfides and imparting a discoloration to said treated petroleum fraction, separating said treated hydrocarbon petroleum fraction, and thereafter washing the treated petroleum hydrocarbon fraction with a solution of an aliphatic alkanolamine containing alkanol groups having 2 to 6 carbon atoms to remove the color bodies produced by contacting the petroleum hydrocarbon fraction with the said phenolic type catalyst containing aqueous alkali metal hydroxide treating solution thereby producing a water-white, doctor sweet petroleum hydrocarbon product.

11. A method in accordance with claim 10 in which the treated hydrocarbon is washed with about one-twentieth of its volume to an equal volume of an aqueous solution of an alkanolamine.

12. A method in accordance with claim 10 in which the phenolic type catalyst is wood tar.

13. A method in accordance with claim 10 in which the alkanolamine is monoethanolamine.

14. A method in accordance with claim 10 in which the alkanolamine is diethanolamine.

15. A method in accordance with claim 10 in which the alkanolamine is triethanolamine.

JOHN P. STANTON.

REFERENCES CITED

The following references are of record in the file of this patent:

UNITED STATES PATENTS

| Number | Name | Date |
| --- | --- | --- |
| 2,152,723 | Yabroff | Apr. 4, 1939 |
| 2,228,041 | Yabroff et al. | Jan. 7, 1941 |
| 2,238,201 | Wilson et al. | Apr. 15, 1941 |
| 2,373,004 | Ayers et al. | Apr. 3, 1945 |
| 2,427,250 | Bond | Sept. 9, 1947 |

FOREIGN PATENTS

| Number | Country | Date |
| --- | --- | --- |
| 557,315 | Great Britain | Nov. 15, 1943 |